United States Patent [19]

Michael

[11] 4,325,766
[45] Apr. 20, 1982

[54] METHOD FOR THE FORMATION OF CORROSION-RESISTANT BODIES AND APPARATUS FOR FORMING THE SAME

[75] Inventor: Vesta F. Michael, Big Spring, Tex.

[73] Assignee: Fiber Glass Systems, Inc., Big Spring, Tex.

[21] Appl. No.: 136,628

[22] Filed: Apr. 2, 1980

[51] Int. Cl.³ ............................................. B65H 81/00
[52] U.S. Cl. .................................. 156/171; 156/172; 156/187; 156/425
[58] Field of Search ............... 156/171, 172, 173, 175, 156/162, 184, 187, 195, 446, 74, 161, 162, 322

[56] References Cited

U.S. PATENT DOCUMENTS

| | | | |
|---|---|---|---|
| 3,033,729 | 5/1962 | Shubert | 156/173 |
| 3,260,796 | 7/1966 | Hirtzer | 156/172 |
| 3,629,028 | 12/1971 | McLarty et al. | 156/175 |
| 3,700,527 | 10/1972 | Grosh | 156/430 |
| 4,063,838 | 12/1977 | Michael | 156/175 |
| 4,089,719 | 5/1978 | Sundell | 156/171 |
| 4,106,797 | 8/1978 | Michael | 156/173 |
| 4,174,243 | 11/1979 | Magarian | 156/175 |

FOREIGN PATENT DOCUMENTS 1280653  10/1968  Fed. Rep. of Germany ...... 156/195

Primary Examiner—Michael W. Ball
Attorney, Agent, or Firm—Neuman, Williams, Anderson & Olson

[57] ABSTRACT

A method of forming corrosion-resistant fiber reinforced resin bodies is provided. The method comprises saturating longitudinal and substantially transversely wound spiral filaments with a hardenable resin prior to winding the same about a body form. The filaments are applied in such manner as to assure the absence of air entrapment with resultant superior strength. The filaments follow a predetermined path so as to assure saturation thereof and maintain resin wastage at a minimum. Apparatus employed in the provided method enables the forming method to be carried out in a highly efficient manner whereby glass-reinforced objects such as fittings are rapidly formed in a minimum amount of time and wastage of the materials of formation is maintained at a minimum.

10 Claims, 13 Drawing Figures

FIG. 1
FIG. 2
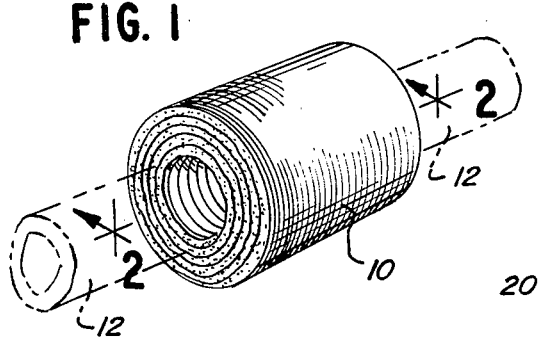
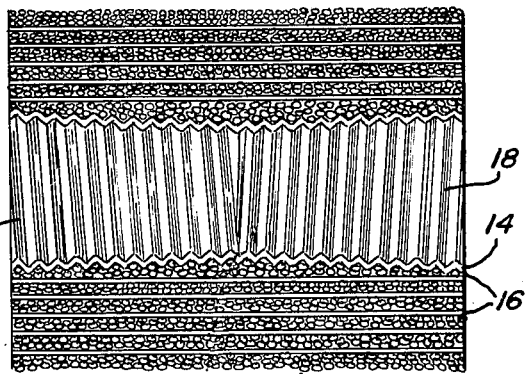
FIG. 3
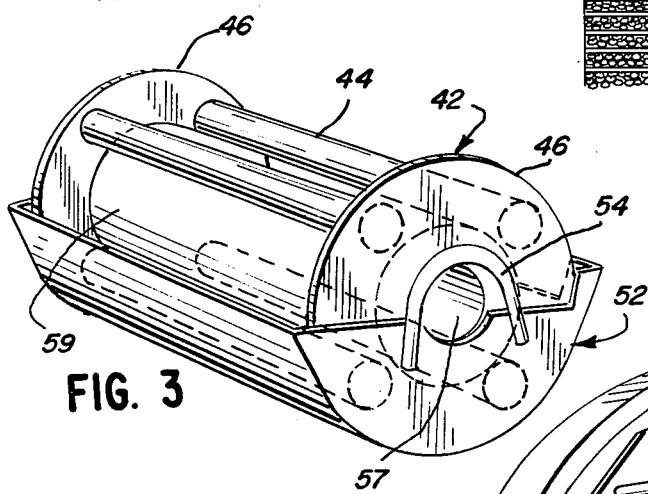
FIG. 4
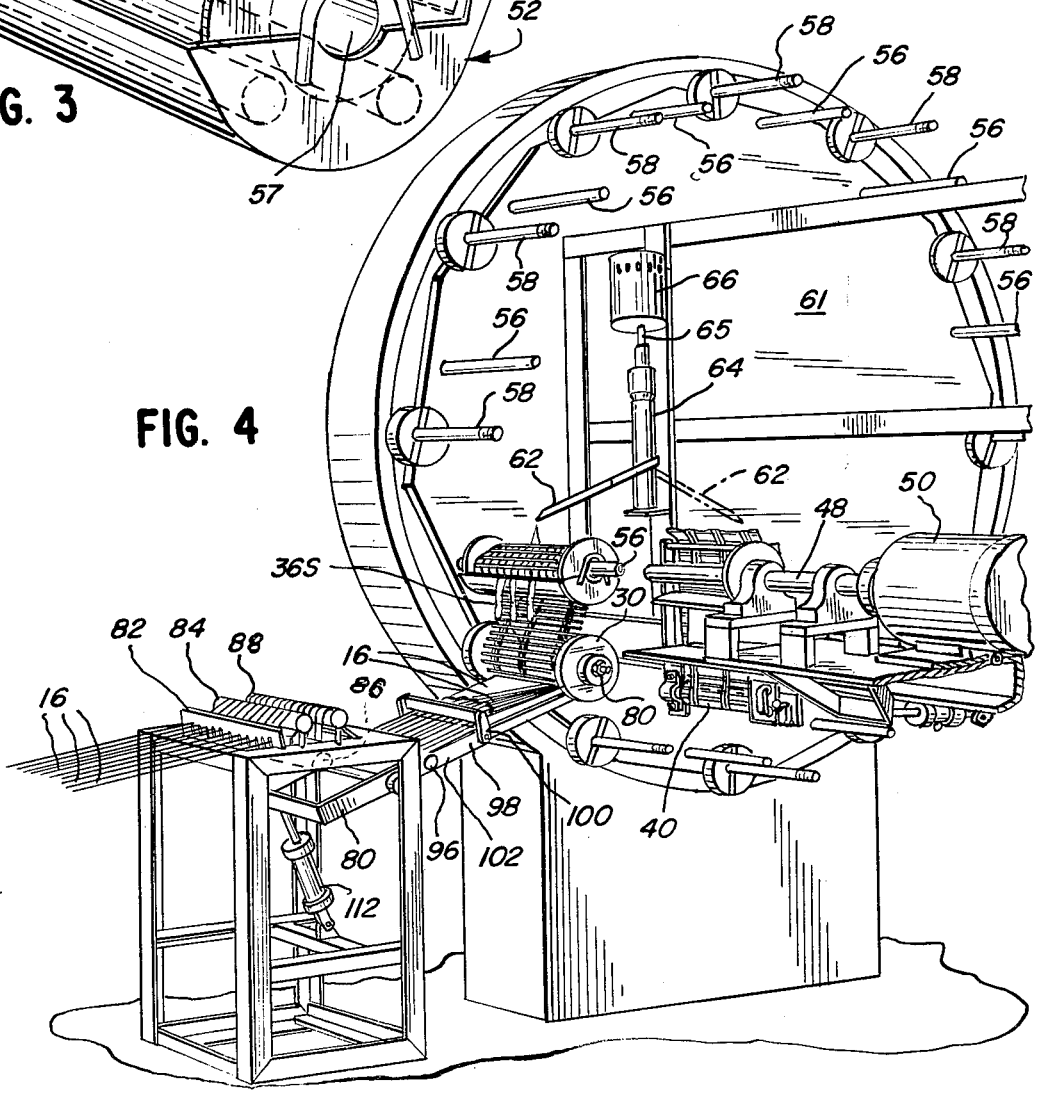

METHOD FOR THE FORMATION OF CORROSION-RESISTANT BODIES AND APPARATUS FOR FORMING THE SAME

This invention relates to the formation of corrosion-resistant bodies such as fittings and couplings formed of filament-reinforced resin. Such couplings are of the type disclosed in my earlier U.S. Pat. Nos. 4,063,838 granted Dec. 20, 1977 and 4,106,797 granted Aug. 15, 1978. The prior art is cognizant of the desirability of the use of corrosion-resistant bodies such as pipes and fittings in industries such as the chemical and oil industries wherein corrosive solutions are employed.

The properties of corrosion resistant and strength inherent in such fiber reinforced bodies have been described in some detail in my two earlier patents which are commonly owned with the subject application. The disclosures of such earlier patents are incorporated herein by reference.

A reinforced resin body of superior strength and having particular applicability in carrying out the inventive steps of this invention comprises a fitting employed in coupling the ends of two pipes which coupling is formed of glass-filament reinforced epoxy resin. The resin component of such composition has been a continuously increasing cost factor in the manufacture of such fittings. The provided method not only provides steps for maintaining wastage of a hardenable epoxy at a minimum, but, in addition, provides steps assuring substantially complete reinforcing fiber saturation so that the strength of the resulting product formed is maximized.

It is an object of this invention, therefore, to provide a method for the formation of a corrosion-resistant, reinforced body which maintains wastage of materials of formation at a minimum while simultaneously providing bodies of optimum strength.

It is another object of this invention to provide apparatus for forming a filament-reinforced resin body such as a fitting in which the above objects are accomplished while producing such fittings in an efficient, substantially continuous process.

In one embodiment of the provided invention a web or fabric of predetermined length of primarily longitudinal reinforcing glass filaments is saturated in a curable, epoxy resin-hardener mixture and wound upon itself to form a saturated source roll. A fitting form such as externally threaded nipples adapted to form an internally threaded coupling member has a parting agent such as wax applied thereto after which a curable resin paste is applied to fill in the threads and to form a substantially void-free cylinder-like configuration. The resulting form is then rotatably driven and two wraps of the saturated roll of longitudinal filaments are applied parallel to the form length, whereafter spiral wraps of reinforcing filaments applied transversely to the longitudinal filaments are applied simultaneously with the longitudinal wrap. The spiral filaments are initially applied to the form center under tension whereafter they are fanned outwardly from the center toward the opposed ends of the form and partially formed fitting. By being initially applied at the form center, any air entrapped in the form longitudinal wraps and between the wraps and form is squeezed out progressively toward the form ends.

The longitudinal reinforcing filaments and spiral reinforcements are simultaneously applied until the body of the coupling or the like has been built up to its desired dimensions and body thickness.

In accordance with this invention, whereas the wraps of longitudinal filaments are saturated and fed from a saturated source roll, the reinforcing filaments to be spirally wound about the form are fed from source rolls or spools in the dry state from which they pass over a guide surface prior to being pulled onto the periphery of the rotatably driven coupling form. The guide surface is inclined to the rotating mandrel and receives resin-hardener solution draining and dripping from the overlying form about which the reinforcing filaments are being wound. Simultaneously, additional resin-hardener solution is applied to the rotating form and the partially-formed body formed thereabout to assure complete reinforcing filament saturation. The excess solution drips onto the underlying guide surface which is designed to form a pool through which the initially dry reinforcements pass, whereby saturation of said ultimately spiral reinforcements is assured. The rotating form may be mounted on a movable support which following formation of the fitting or the reinforced body to the desired size continues to rotate while passing through a heated curing zone wherein uniform and final cure of the formed fitting is completed.

For a more complete understanding of this invention reference will now be made to the drawings wherein:

FIG. 1 is a perspective view of a filament reinforced resin body made in accordance with this invention comprising a coupling adapted to be used in connecting the pins ends of two pipe members illustrated in phantom lines;

FIG. 2 is a longitudinal sectional view illustrating an internally threaded coupling member made in accordance with this invention as formed about two inwardly tapered forms such as are illustrated in FIG. 5;

FIG. 3 is a perspective view of a supporting bucket member in which is mounted a relatively rotatably movable assemblage of parallel rods mounted in end discs and employed in forming a saturated roll of longitudinal reinforcements for use in accordance with the method of the provided invention;

FIG. 4 is a fragmentary perspective view illustrating apparatus employed in conjunction with the formation of filament reinforced resin bodies such as pipe coupling members in accordance with the method of this invention;

DESCRIPTION OF THE INVENTION

Figure 5:
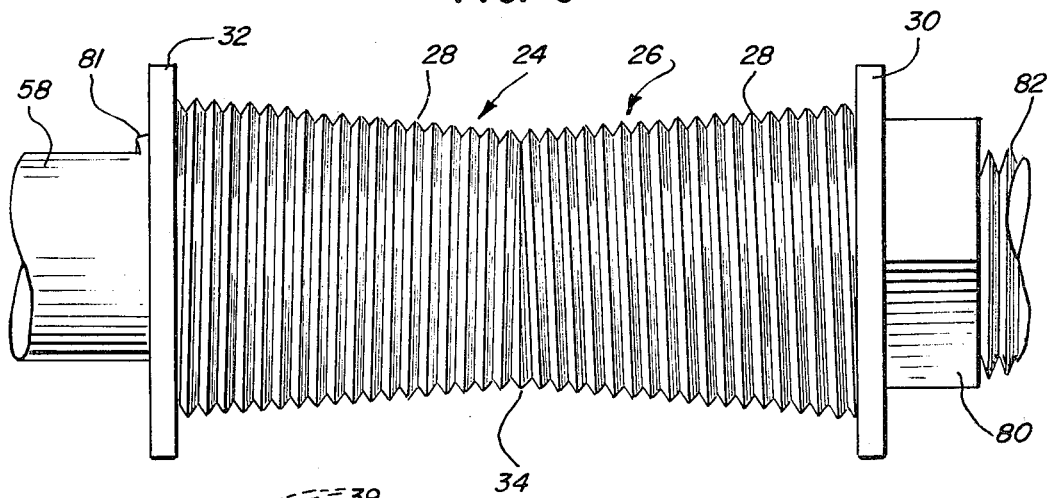
FIG. 5 is an elevational view illustrating threaded forms for forming the coupling of FIG. 2 mounted on a rotatable mandrel.

Referring now particularly to FIG. 1 a coupling 10 comprising a resin body reinforced by alternately arranged layers of longitudinal and transverse glass filaments is illustrated. Such coupling is of the type of reinforced resin body disclosed in my commonly owned earlier U.S. Pat. No. 4,138,285 directed to filament reinforced rods, couplings and pipe members, the disclosure of which is incorporated herein by reference.

FIG. 1 illustrates a coupling 10 in engagement with the pin ends of two pipe members 12 illustrated in phantom and fragmentarily shown. FIG. 2 is a longitudinal sectional view of coupling 10 illustrating layers of longitudinal filamentous reinforcements 14 which alternate with layers of transversely arranged layers of filamentous reinforcements 16. Such filaments 14, 16 are disposed in a void-free matrix of a hardened resin. Particularly suitable for purposes of carrying out my invention are untwisted glass roving filaments arranged in a matrix of hardened epoxy resin, the resin being hardened by means of a hardener such as triethylene tetramine.

It will be noted that the layers of filamentous reinforcements 14, 16 have been formed about threaded forms thereby defining the coupling female threads 18 and 20 which are oppositely disposed. Such threads readily receive the male threads on the pin ends of pipe members such as pipe members 12 illustrating in phantom in FIG. 1 in a normal right hand threaded engagement as the pin ends are screwed into the opposed coupling ends.

FIG. 5 illustrates two threaded forms or nipples 24, 26 having formed about the outer peripheries thereof tapered male threads 28, the later threads forming the coupling female threads 18 and 20 of FIG. 2. Also comprising a portion of the coupling forms 24 and 26 are enlarged annular ends 30 and 32 respectively defining one end of each form threaded surface portion. As seen in FIG. 5 the threaded surface portions of the forms 24 and 26 terminate at a central line of juncture 34 whereat the two threaded forms 24 and 26 abut.

In the normal course of coupling formation the forms 24 and 26 are subjected to a heat treatment to assure heat curing of the subsequently applied resin-hardener composition from the inside and obviate lack of curing of the innermost portion of the final coupling when the same is passed into a curing chamber. Following such heat treatment the threads 28 of the coupling forms 24 and 26 are filled with a hardenable resinous composition after a parting agent such as paraffin wax or the like has been applied to the surfaces of the forms. A composition which has been found to be particularly satisfactory for purposes of forming threads in couplings such as the illustrated couplings 10 comprises 100 parts by weight of epoxy resin, 12 parts by weight of the hardener triethylene tetramine based on the weight of the resin, 30 parts by weight of 200 mesh silica powder and a thixotropic agent such as that sold under the brand name CAB-O-SIL, such agent being present in the amount of about two parts by weight per 100 parts by weight of the resin. Such resinous composition is applied so as to completely fill in the roots of the threads 28 on the two forms 24 and 26. Care is exercised to insure the fact that the applied resinous composition is void-free, as voids would give rise to weakness in the final coupling construction and lead to premature failure as by thread fracture or the like. Following application of the thread composition, alternate layers of longitudinal and transverse spirals of filamentous reinforcements are applied similar to the manner disclosed in my earlier patents, resulting in the structure of FIG. 2.

However, in accordance with this invention apparatus and particular method steps are employed for purposes of insuring that the resulting body of filaments and matrix of resin is substantially completely void free, insuring the absence of focal points of weakness where failure may originate.

Figure 6:
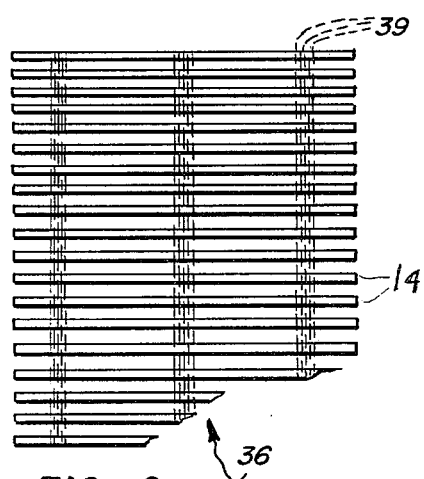
FIG. 6 is a fragmentary plan view of a web-like assemblage of longitudinal filament reinforcements employed in forming filament reinforced resin bodies made in accordance with the teachings of this invention.

In accordance with this invention, longitudinal filaments loosely connected in the form of an integral web or mat and having a length substantially equal to the length of the final coupling body to be formed is applied to the periphery of the forms 24 and 26 of FIG. 5 following application of the above-described thread composition and parting agent. FIG. 6 comprises a fragmentary plan view of such an integral mat 36 composed of longitudinal filaments of untwisted glass woving 14 interconnected into an integral assemblage by means of spaced transverse interconnecting threads 39. Prior to being applied to the coupling forms illustrated in assembled relation in FIG. 5, the longitudinal roving strand web 36 and the filaments thereof are completely saturated with an epoxy resin-hardener solution such as of the type above described, namely epoxy resin together with a triethylene tetramine hardener.

Figure 13:
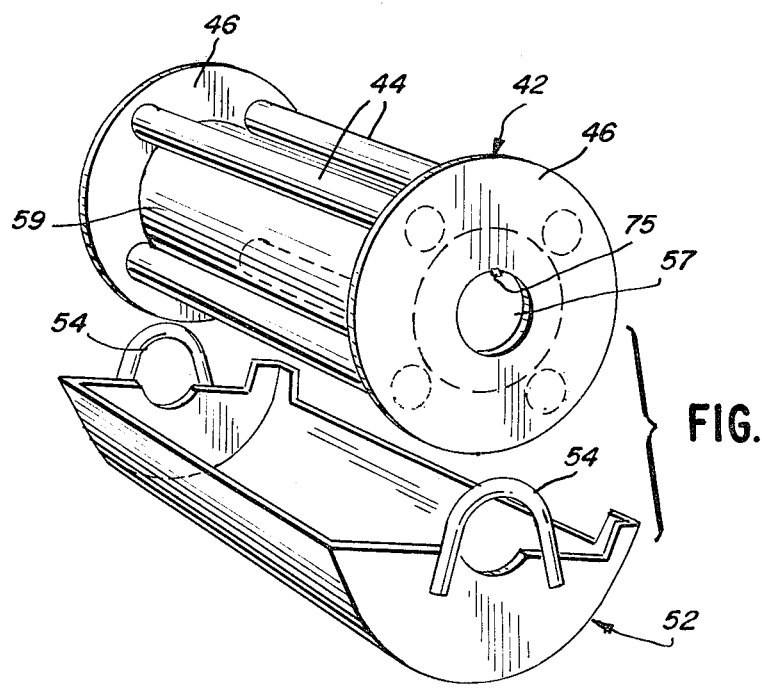
FIG. 13 is a perspective view illustrating the elements of the assembly of FIG. 3 in spaced relation.

Such preliminary saturation step is effected by unwinding a dry length of web 36 from a source roll such as source roll 40 illustrated in phantom in FIG. 4. The mat is wound about parallel rods or tubes 44 and central cylinder 59 of a rotating form such as cage 42 of FIGS. 3 and 13 in which a plurality of the transverse, equally spaced rods 44 as well as cylinder 59 are mounted on end rings 46. Form 42 is rotatably driven as by a drive shaft 48, see FIG. 4, interconnecting with a drive shaft of a drive motor 50. The cage or assemblage 42 of FIG. 3 is rotatably mounted relative to a relatively stationary underlying bucket 52 having bails 54 disposed at opposed bucket ends. The bails are adapted to supportably engage traversing, supporting shaft members such as stationary shaft 56 illustrated in FIG. 4. Such supporting shafts are adapted to be readily received in central passageway 57 disposed in central cylinder 59 of form 42 as illustrated in FIGS. 3 and 13.

FIG. 4 also illustrates a plurality of stationary shafts 56 arranged at regular angular intervals about the periphery of rotatable drum or disc surface 61. Adjacent each stationary shaft 56 is a rotatable shaft 58 on which the threaded forms of FIG. 5 are adapted to be mounted in the normal course of coupling formation.

In accordance with the method of this invention the reinforcing web or mat 36 in the course of being unwound from the source roll 40 which is mounted laterally of the rotating disc 61 as illustrated in FIG. 4 is pulled from such source roll. Such pull is effected by the rotatable cage 42 attached to the web distal end as the cage 42 of FIGS. 3 and 13 is rotatably driven by the drive shaft of drive motor 50. As the reinforcing mat of longitudinal filaments is wound about the cage rods 44, a hardenable epoxy resin-hardener fluid is dispensed from a pivotally mounted spout 62 which extends from a mixing chamber 64 in which a mixing rod 65 is rotating as a result of being driven by mixing motor 66 also illustrated in FIG. 4. Mixing chamber 64 receives the desired relative portions of epoxy resin and triethylene tetramine from sources not illustrated by means of conduits in a manner well-known in the art. Bucket 52 is supportably disposed on shaft 48 by bails 54 to collect any excess resin-hardener solution unabsorbed by the mat 36. Following mat saturation the collected solution may be returned to chamber 64 or otherwise employed in the process disclosed.

Figure 7:
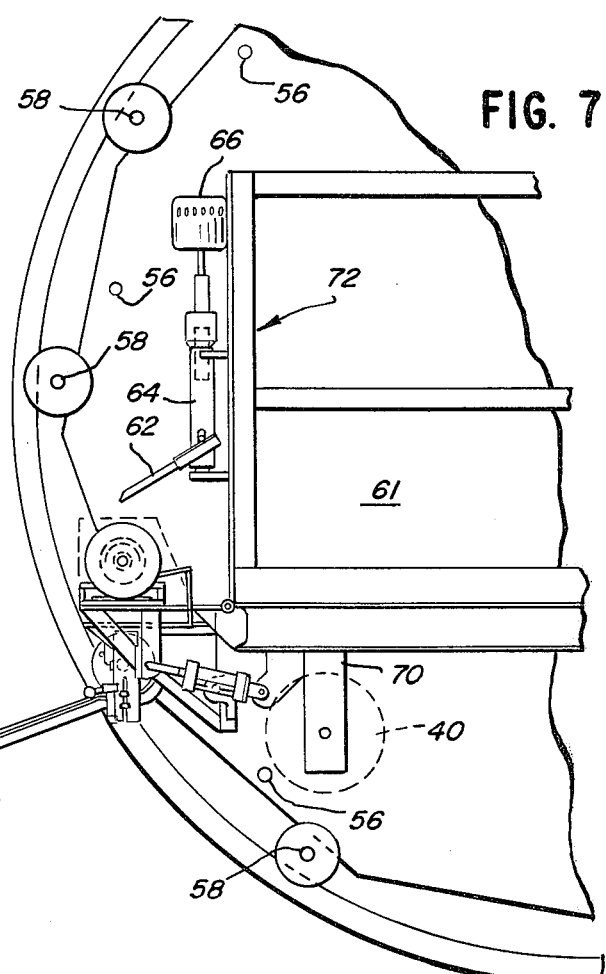
FIG. 7 is a fragmentary side elevational view of a portion of the apparatus illustrated in FIG. 4.
Figure 8:
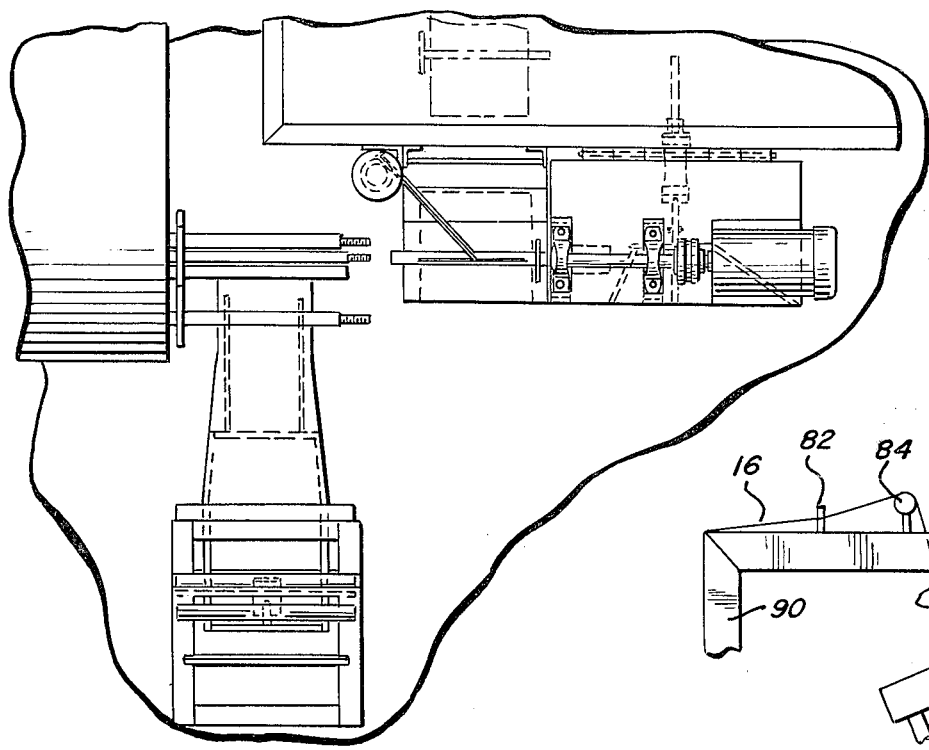
FIG. 8 is a plan view of apparatus illustrated in FIGS. 7 and 9.

It will be seen from FIG. 7 that the source roll 40 illustrated in phantom line is rotatably mounted on stationary supports 70 and the resin dispensing system comprising the mixing motor 66, the mixing chamber 64 and the dispensing spout 62 is similarly mounted on a stationary framework 72 disposed adjacent the rotatable disc 61.

Figure 9:
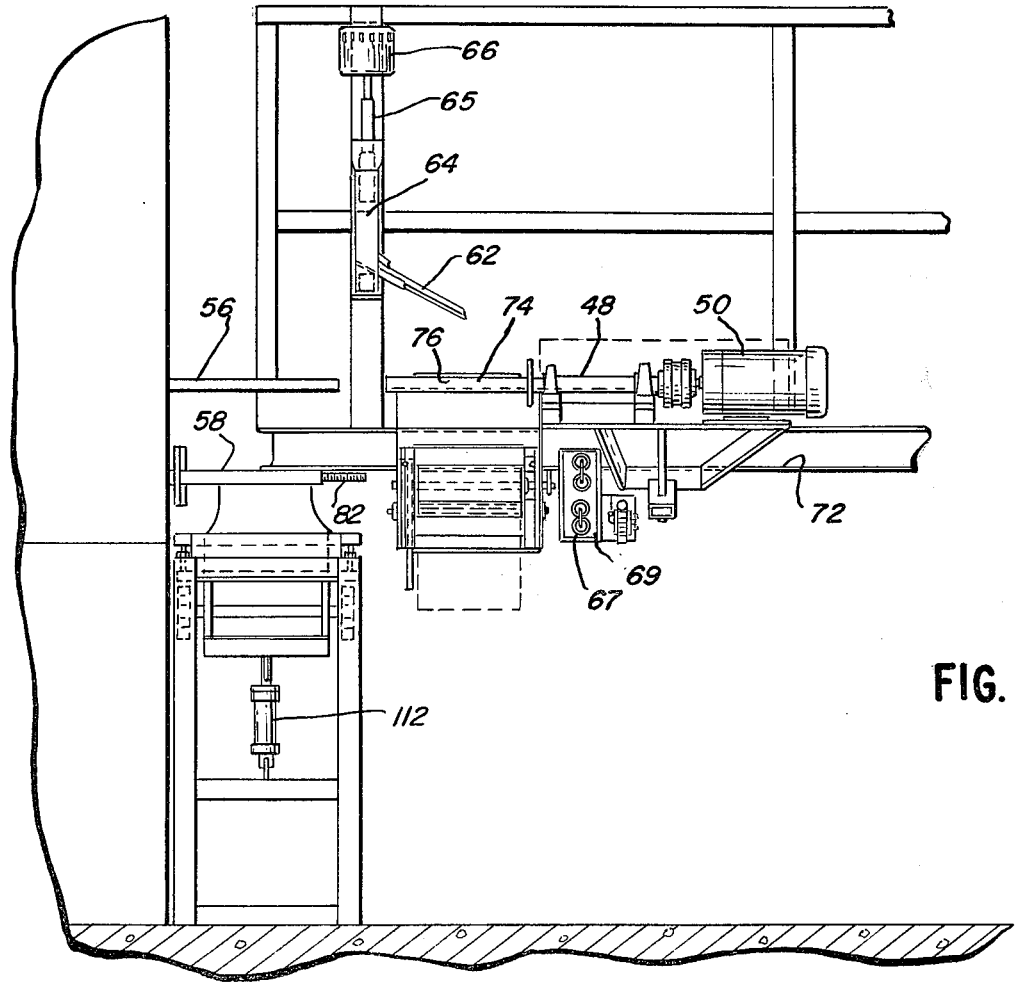
FIG. 9 is a front elevation view of the apparatus illustrated in FIGS. 7 and 8.

It will be more clearly seen from FIG. 9 that the shaft 48 driven by the motor 50 has a splined extension 74 comprising a continuation of shaft 48. Spline 76 is received in a keyway 75 (FIG. 13) of the rotatable cage end rings 46, for purposes of rotatably driving the same as the cage rotates relative to the stationary underlying bucket 52. Any resin-hardener composition dispensed from the spout 62 not absorbed by the mat of longitudinal roving will be caught by the bucket 52.

After the desired length of the longitudinal reinforcement mat 36 illustrated in FIG. 6 has been wound on the rod-ring assemblage 42 of FIG. 3, such predetermined length is cut free from the source roll 40 and the mat with the bucket and rod assemblage 42 is slid from the shaft spline 76 transversely onto the adjacent stationary support shaft 56 mounted on the rotatable disc 61. Following the web saturating operation resin-hardener composition disposed in the bottom of bucket 52 may be used for saturation of other dry filament reinforcements.

It will be noted from FIG. 4 that each stationary shaft 56 is disposed a predetermined spaced distance relative to the underlying rotating shaft 58. Each shaft 58 is adapted to receive the threaded forms 24 and 26 in the manner illustrated in FIG. 4. The workman in control of the illustrated apparatus of FIG. 4 is able to effect rotation of the rotatable shafts 58 driven by a single continuous drive belt or chain (not illustrated) as by means of control button 67 mounted in box 69 secured to the stationary framework 72 as illustrated in FIG. 9. Each assembly of threaded forms 24 and 26 may be locked to a rotatable shaft 58 mounted on the disc 61 by means of a readily releasable lock nut 80 adapted to engage a threaded end 82 of a rotating shaft 58. Stop 81 may be employed as a stop for locating the inner end of the form assembly on shaft 58 as illustrated in FIG. 5. A threaded shaft end limit 82 is also seen in FIG. 9. After the saturated longitudinal reinforcement web has been mounted on a stationary shaft 56 in the manner of FIG. 4 and the forms 24 and 26 have been mounted on a lower rotatable shaft 58 disposed at the lower, coupling-forming work station illustrated in FIG. 4, the operator presses an appropriate button in the box 69 for purposes of rotatably actuating the shafts 58. The resin-wet, lead distal end of the saturated mat portion disposed on the cage 42 mounted on overlying shaft 56 is contacted with the rotating forms 24 and 26 of FIG. 5 and two wraps of such resin-saturated mat are pulled onto and wound about the forms. Following application of two mat wraps, the lead ends of converging longitudinal roving filaments 16 illustrated in FIG. 4 are applied to the center of the rotating forms. By application to the center, the initial wraps of the filaments 16 are wound thereabout and upon continued rotation of the shaft 58 on which the forms 24 and 26 are mounted, the converging filaments in the initial condition of FIG. 4 gradually fan out laterally toward the opposed ends of the forms between the end discs 30 and 32. Such initial application and subsequent spreading out tends to squeeze any air entrapped in the mat and epoxy resin outwardly as the filaments 16 which are spirally wound about the forms 24 and 26 progress from the center of the forms 24–26 outwardly.

As above mentioned in the initial description of the coupling 10 illustrated in FIG. 2, the coupling is formed of alternate layers of filaments 14 which comprise the longitudinal filaments of the web 36 as well as the spiral filaments 16 which are fed longitudinally over a pivotally mounted support tray 102 having sides 105 as illustrated in FIG. 4. The filaments 16 proceed from source spools and reels disposed to the left in FIG. 4 and not illustrated, through a filament separator guide 82 over and beneath a series of three tensioning rolls 84, 86 and 88 more clearly seen in FIG. 10.

The series of tensioning rolls is mounted on a supporting box-like frame member 90. It will be noted from FIG. 10 that the depth to which the center tension roll 86 depends below the level of the rolls 84, 88 is adjusted by means of an adjustable screw 91 which positions such center roll 86. Thus if additional tension is desired on the incoming, spirally-applied roving filaments 16, the distance roll 86 depends below the level of the rolls 84 and 88 is increased. If tension of such filaments is to be decreased, the roll 86 is raised in the direction of the remaining tensioning device rolls 84 and 88.

Figure 10:
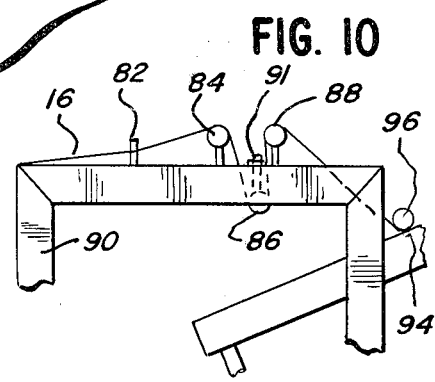
FIG. 10 is a fragmentary side elevational view of a tensioning device employed for purposes of imparting a desired tension to filament reinforcements in the course of carrying out the method of this invention.
Figure 11:
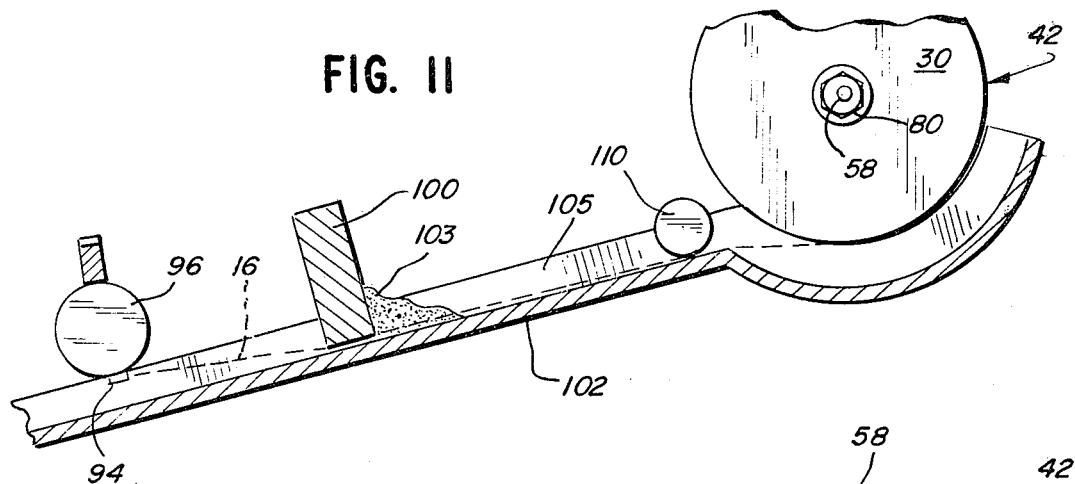
FIG. 11 is a fragmentary side sectional view illustrating a filament guide tray employed in the provided apparatus of this invention in an elevated position of use.

Following passage from the final tensioning roll 88, the filaments 16 to be spirally wound about the rotating forms 24 and 26 pass through guide eyelets 94 mounted on guide roll 96 see FIG. 10, from which the filaments 16 pass beneath a vertical dam-like member 100, see FIGS. 4 and 11.

Tray 102 is normally upwardly inclined to rotating forms 24 and 26 about which the coupling 10 is ultimately formed in the manner illustrated in FIGS. 4 and 11. Such upward inclination enables epoxy resin-hardener composition or other liquid hardenable resinous composition dispensed from spout 62 to flow by gravity after dropping from the rotating saturated mat disposed on cage 42 of FIG. 3, and from the partially formed fitting disposed on the rotating shaft 58. The excess liquid resin-hardener composition which is dispensed onto the saturated mat 36 while being pulled onto forms 24, 26 by spout 62 may also be collected on tray 102 as illustrated in FIG. 11, forming a pool 103.

Thus in the course of the formation of the coupling member 10, by virtue of the tray inclination illustrated in FIG. 11, resin dropping from the saturated mat segment which is being fed to the underlying coupling forms and dropping from the mat portions disposed about the forms in turn drops to the underlying tray 102. The filaments 16 are slidably moved over the surface of tray 102 prior to being guided by rod 110 into the back side of the rotating assemblage of the coupling forms in the manner illustrated in FIG. 11. Accordingly, any resin dropping onto the surface of the tray 102 flows by gravity to the dam 100 beneath which the filaments 16 passing from the bar 96 slidably move and, accordingly, must pass through the pool or bath 103 of accumulated epoxy resin-hardener composition.

The filaments 16 are thus assured of being saturated prior to engaging the rotating forms 24 and 26 mounted on the rotating shaft 58.

The precise angular disposition of the tray 102 may be regulated by a hydraulic or pneumatic cylinder 112 (FIG. 4) which is actuated to lower the tray 102 after the coupling formed about the forms 24 and 26 has reached its appropriate dimensions in the forming station including the lower shafts 56 and 58 of disc 61 illustrated in FIG. 4. Such appropriate dimension may be readily ascertained by the operator when the outermost periphery of the formed filament layers is approximately coincidental with the outer peripheries of the end flanges 30 defining ends of the threaded forms 24 and 26. The end flanges 30 and 32 may thus be seen to function as size-determining gauges. If desired, a caliper may also be employed by the workman in charge of forming the coupling member and after the desired diameter has been reached as determined by the calliper the feeding of the filamentous reinforcements is terminated.

It will be more clearly seen from FIG. 11 that the filaments 16 are engaged with the rotating forms of the coupling by approaching the back side of the rotating coupling forms in the manner illustrated. It will also be most apparent from FIG. 4 of the drawing that the overlying saturated longitudinal filaments 14 approach the rotating forms at the front of the rotating forms whereas the filaments 16 initially engage the rear of forms 24-26. Accordingly, both the longitudinal and spiral filaments are wound simultaneously about the rotating forms after the initial longitudinal wraps. The rotating shaft 58 serves to provide the pulling force pulling the filaments from their source cages or rolls.

After the coupling has been formed to the desired dimensions, the cage assemblage 42 is removed from the stationary shaft 56 and returned with its underlying bucket 52 to the station to the right of the rotating shaft 56 and disc 61 so as to engage the splined shaft 74 illustrated in FIG. 9. The rotatable disc 61 may then be rotated through an angle of about 30° by the operator in view of the fact that there are twelve stations with the shafts 56 rotating continuously except when the shaft drive is disengaged to allow locking of threaded forms to shaft 58 at the lower working station of the disc 61.

Not illustrated in FIG. 4 is a heat treating chamber disposed above the working station defined by the lower shafts 56 and 58 illustrated in FIG. 4 with the saturated longitudinal strand web portion disposed thereon and with the coupling forms disposed thereon respectively. Accordingly, as a new coupling member is formed in the lower working station, couplings which have previously been formed are rotatably mounted on shafts 58 of the disc 61 and passed through a heated, resin-curing chamber with each 30° movement of the disc 61. The rotation of the formed couplings on shafts 58 while curing assures uniformity of fitting composition for desired optimum strength and prevents flow by gravity of the uncured resin-hardener composition. The illustrated disc 61 thus enables twelve couplings to be simultaneously processed after each of the twelve stations is filled.

After a formed reinforced fitting has passed through the last stage of the curing cycle following a 30° disc advance, a workman at the final station removes the fully cured cutting and form assembly from the temporarily stationary shaft 56. The forms 24, 26 are unscrewed from the cured coupling whereafter the forms are returned to the lower coupling-forming station of FIG. 4 for a new cycle.

It has been found that if the filaments employed in couplings of the type above described are not completely saturated, voids will be generated as the resin is absorbed into the dry filaments where the absorbed coating-resin composition was disposed previously. Such voids comprise areas of weakness which lead to fracture, leakage and failure of the coupling in the normal course of use. Such failure may occur as by passage through the coupling of liquid under pressure or by the application of tension, compression or twisting forces to the coupling.

In accordance with this invention the method of applying both the longitudinal and spiral filaments assures complete saturation of all filaments employed. As a result of such initial assured saturation there cannot be any subsequent absorption of the resin into the filaments which results in generated voids. Accordingly, the method of formation above described assures the manufacture of a coupling member in the substantially complete absence of any voids which comprise areas or zones of weakness in the coupling or other reinforced body which will tend to fail when such reinforced body is placed under stress either in torsion, tension or compression.

Figure 12:
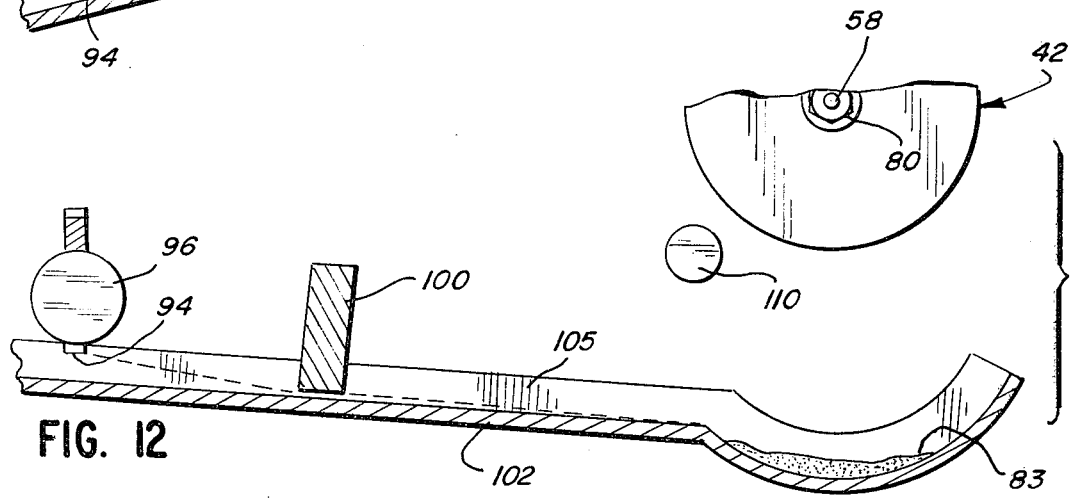
FIG. 12 is a view similar to FIG. 11 illustrating a filament guide tray in a lowered position to facilitate subsequent steps in the carrying out of the coupling manufacturing process of this invention.

It will be apparent from FIG. 4 that after a coupling has been formed, not only may the disc 61 be rotated the desired 30° for a new working station to begin operation, but prior to such rotation the tray 102 is pivoted by the cylinder 112 into the lowered position such as the substantially horizontal position illustrated in FIG. 12. In such lowered position room is provided whereby the disc 61 may rotate without the shafts of the new incoming station engaging the guide tray. In addition, any epoxy resin which has been drained into the tray 102 may be recovered as in depression 83 of FIG. 12 by the workmen in a container for subsequent manual application either to the longitudinal filaments in the course of forming a new saturated mat about the rods 44 of the cage 42 or in the mat saturating station disposed to the right of the disc 61. Thus the recovered resin composition may be efficiently utilized on saturating the incoming filaments in the course of the formation of the coupling on the rotating mandrel affixed to the disc 61 in the manner illustrated in FIG. 4. Accordingly the resin in FIG. 4 may be applied manually as well as semi-automatically from the spout 62 which is pivotally movable between the two stations comprising the web saturating station to the right of the coupling formation station.

Although the resin-dispensing spout 62 is illustrated as movable between the two stations illustrated, it is, of course, obvious that separate sources of epoxy resin may be employed for the two separate stations. The saturated mats of longitudinal filaments 14 may be formed simultaneously with the formation of the coupling so that upon termination of the formation of the coupling at one station on the disc 61 a saturated web or mat on cage 42 may be ready for the subsequent coupling formation. It is, of course, also possible that the web 36 may be saturated on cage 42 and the coupling formation may be effected simultaneously with adequate resin being dispensed by the single dispensing spout 62 as the same is swung at desired intervals between the two stations.

It is believed apparent from the foregoing, therefore, that a novel apparatus and process have been provided whereby void-free filament reinforced resin bodies may be formed assuring a glass-reinforced resin body free from points of weakness. The number of stations illustrated in the rotating disc are provided by way of illustration only as it is believed apparent that the stations may vary as desired. The novel method of feeding the spiral filament reinforcements above described insures the fact that the resin employed in the saturation process is substantially completely utilized maintaining wastage and the cost of the resin element of the formed body to a minimum. The single resin dispensing station enables two operations to be carried out simultaneously as the dispensing spout is swung back and forth between the two stations.

The foregoing has made apparent a number of modifications which may be made in the method and apparatus disclosed which will not depart from the ambit of the invention. Accordingly, the invention of this case is to be limited only by the scope of the appended claims.

What is claimed is:

1. In a method for forming a filament-reinforced, corrosion-resistant body of predetermined length about a rotatable form, the steps comprising winding a web of substantially parallel filaments having a width substantially equal to said predetermined length about a first rotatable form at a first station; said filaments extending substantially axially of said form; saturating said web with a hardenable resin at said first station; winding the saturated web from said first rotatable form about a second rotatable form for said body at a second body-forming station; simultaneously applying reinforcing filaments spirally about said second form with said saturated web whereby longitudinal and transverse spiral reinforcing filaments are applied to said second form simultaneously moving filaments forming said spirals over a guide surface prior to engaging said second rotatable form; said guide surface having hardenable resin thereon whereby said filaments forming said spirals are saturated with hardenable resin prior to engaging said rotatable form.

2. The method of claim 1 wherein said guide surface is inclined in the direction of said second body form at said second station whereby hardenable resin dripping from said body at said second station flows counter to the movement of the filaments forming said spirals.

3. The combination of claim 2 in combination with means for moving the filament-reinforced resin bodies formed at said formation station through a heated zone for curing said resin bodies; said rotating shafts rotating substantially continously while passing through said heated zone.

4. In combination a plurality of rotating shafts for mounting forms for forming filament-reinforced resin bodies; a plurality of means for mounting saturated reinforcing filaments for use in forming said reinforced resin bodies; said reinforcing filaments being arranged substantially axially of the mounting means on which disposed; each of the mounting means comprising a resin coating assembly for coating filaments mounted thereon; each mounting means being disposed adjacent one of said rotating shafts whereby said rotating shafts and mounting means are arranged in associated pairs; means for moving said associated pairs seriatim through a body-formation station whereat saturated filaments mounted on one of said mounting means are pulled from one of said mounting means by its associated rotating shaft and wound about said rotatable shaft; means at said formation station for feeding resin-saturated filaments to the latter associated shaft transversely to said saturated filaments received from said one mounting means simultaneously with said saturated filaments received from said mounting means until a filament-reinforced resin body of desired size has been formed.

5. The combination of claim 4 in which said means for feeding the transverse resin-saturated filaments comprise a movable inclined guide means over which said transverse filaments are moved, and a pool of liquid resin disposed on said inclined guide means through which said transverse filaments move prior to being wound about said rotating shaft.

6. The combination of claim 5 in which said movable inclined guide means is normally disposed in an upper inclined position extending beneath said rotating shaft at said body formation station whereby resin dripping from the filaments disposed about said rotary shaft will flow by gravity into said pool of resin for replenishing the same.

7. The combination of claim 5 in which said inclined guide means may be lowered to substantially the horizontal position following formation of a reinforced resin body at said formation station and a depression is formed therein whereby liquid resin may flow thereinto in the guide means lowered position for recovery.

8. In combination, a first station for saturating a web of predetermined width and length with a hardenable resin and winding the same about a rotatable form; said web having longitudinal filaments extending substantially axially of said form; a second station for forming a filament-reinforced, corrosion-resistant resin body comprising a rotatable shaft; means for supporting said rotatable form and saturated web formed in said first station adjacent said rotatable shaft; a body form mounted on said rotatable shaft for forming a filament reinforced resin body by pulling said saturated web from said rotatable form; means for simultaneously feeding reinforcing filaments transversely to said rotatable shaft and body form mounted thereon as said shaft pulls said saturated web from said rotatable form; and means for simultaneously guiding and saturating said reinforcing filaments prior to engagement with said rotatable form whereby all filaments disposed about said rotatable body form are substantially completely saturated with hardenable resin.

9. The combination of claim 8 in which said rotatable form comprises a plurality of spaced parallel members annularly arranged on end support rings; said rods and rings being rotatable relative to an underlying discrete means for collecting liquid resin dripping from the saturated web disposed about said parallel members.

10. The combination of claim 4 or 8 in further combination with means engaging the transversely applied reinforcing filaments prior to reaching said rotatable shaft for imparting a desired tension thereto.

* * * * *